(12) United States Patent
Kakkireni et al.

(10) Patent No.: US 12,730,016 B2
(45) Date of Patent: Sep. 8, 2026

(54) COMMUNICATION OF THERMAL STATES FOR CHIPLETS

(71) Applicant: QUALCOMM Incorporated, San Diego, CA (US)

(72) Inventors: Prashanth Kumar Kakkireni, Bengaluru (IN); Tejas Grandhi, Bangalore (IN); Ramacharan Sundararaman, San Jose, CA (US); Christophe Avoinne, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 298 days.

(21) Appl. No.: 18/531,452

(22) Filed: Dec. 6, 2023

(65) Prior Publication Data

US 2025/0189385 A1 Jun. 12, 2025

(51) Int. Cl.
*G01K 13/10* (2006.01)
*G01K 1/02* (2021.01)
*G01K 3/00* (2006.01)

(52) U.S. Cl.
CPC ............. *G01K 13/10* (2013.01); *G01K 1/026* (2013.01); *G01K 3/00* (2013.01)

(58) Field of Classification Search
CPC .......... G01K 13/10; G01K 1/026; G01K 3/00; G06F 11/3058; G06F 1/206
See application file for complete search history.

(56) References Cited

U.S. PATENT DOCUMENTS

2006/0289862 A1* 12/2006 Yoshida ................ H10W 90/00 257/E23.08
2021/0243286 A1* 8/2021 Migliorino ............ G06F 1/3287
2022/0294455 A1 9/2022 Kumashikar et al.
2022/0300049 A1 9/2022 Dahiya et al.
2022/0413593 A1* 12/2022 Kakkireni ............... G06F 1/324
2023/0292449 A1* 9/2023 Lee ....................... G01L 1/2262
(Continued)

FOREIGN PATENT DOCUMENTS

WO 2022086731 A1 4/2022
WO 2022271418 A1 12/2022

OTHER PUBLICATIONS

Anonymous: "Intel Atom(TM) Processor C2000 Product Family for Microserver Datasheet", Intel Data Sheet, Jan. 1, 2016, pp. 1-745, XP055623866, US, pp. 144-151.
(Continued)

*Primary Examiner* — John E Breene
*Assistant Examiner* — Manuel Salvador Castellon, Jr.
(74) *Attorney, Agent, or Firm* — Loza & Loza, LLP

(57) ABSTRACT

Communication of thermal states is described for chiplets. An example includes a chiplet and a plurality of chiplet thermal sensors thermally coupled to the chiplet and configured to generate thermal signals in response to a temperature of the chiplet. A chiplet thermal combiner is coupled to the thermal sensors and configured to receive the thermal signals from the thermal sensors, to generate a combined thermal signal in response, and to generate a temperature signal in response to the combined thermal signal. An external connector is coupled to the chiplet thermal combiner and configured to assert the temperature signal to an external component to activate a thermal mitigation.

20 Claims, 5 Drawing Sheets

(56) References Cited

U.S. PATENT DOCUMENTS

| | | | | |
|---|---|---|---|---|
| 2024/0378172 | A1* | 11/2024 | Piednoel | G06F 1/3287 |
| 2025/0004540 | A1* | 1/2025 | Tsien | G06F 1/3275 |
| 2025/0061004 | A1* | 2/2025 | Agarwal | G06F 9/505 |

OTHER PUBLICATIONS

Anonymous: "Intel Atom(TM) Processor Z6xx Series Datasheet", Apr. 1, 2011, pp. 1-47, XP055233101, p. 15, tables 2-7 pp. 31-36, paragraph 5 p. 42, tables 6-3.

Anonymous: "TPS65994AE Dual Port USB Type-C and USB PD Controller with Integrated Source Power Switches", Jun. 1, 2021, pp. 1-64, XP093231694, p. 34, paragraph 8.3.8.1, 64 Pages, tables 8-3.

International Search Report and Written Opinion—PCT/US2024/050183—ISA/EPO—Jan. 2, 2025.

* cited by examiner

Figure 4:
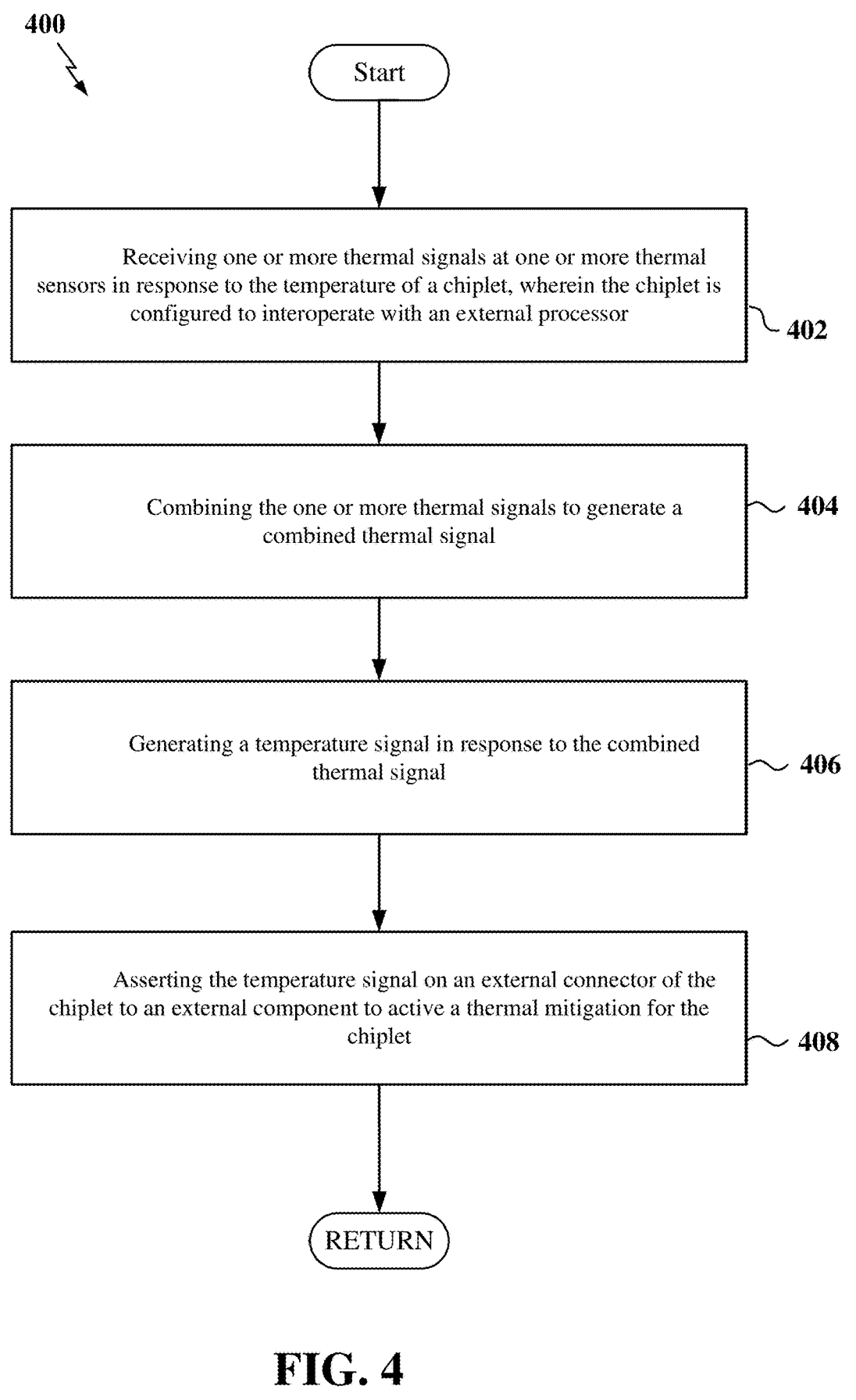

400

Start

Receiving one or more thermal signals at one or more thermal sensors in response to the temperature of a chiplet, wherein the chiplet is configured to interoperate with an external processor

402

Combining the one or more thermal signals to generate a combined thermal signal

404

Generating a temperature signal in response to the combined thermal signal

406

Asserting the temperature signal on an external connector of the chiplet to an external component to active a thermal mitigation for the chiplet

408

RETURN

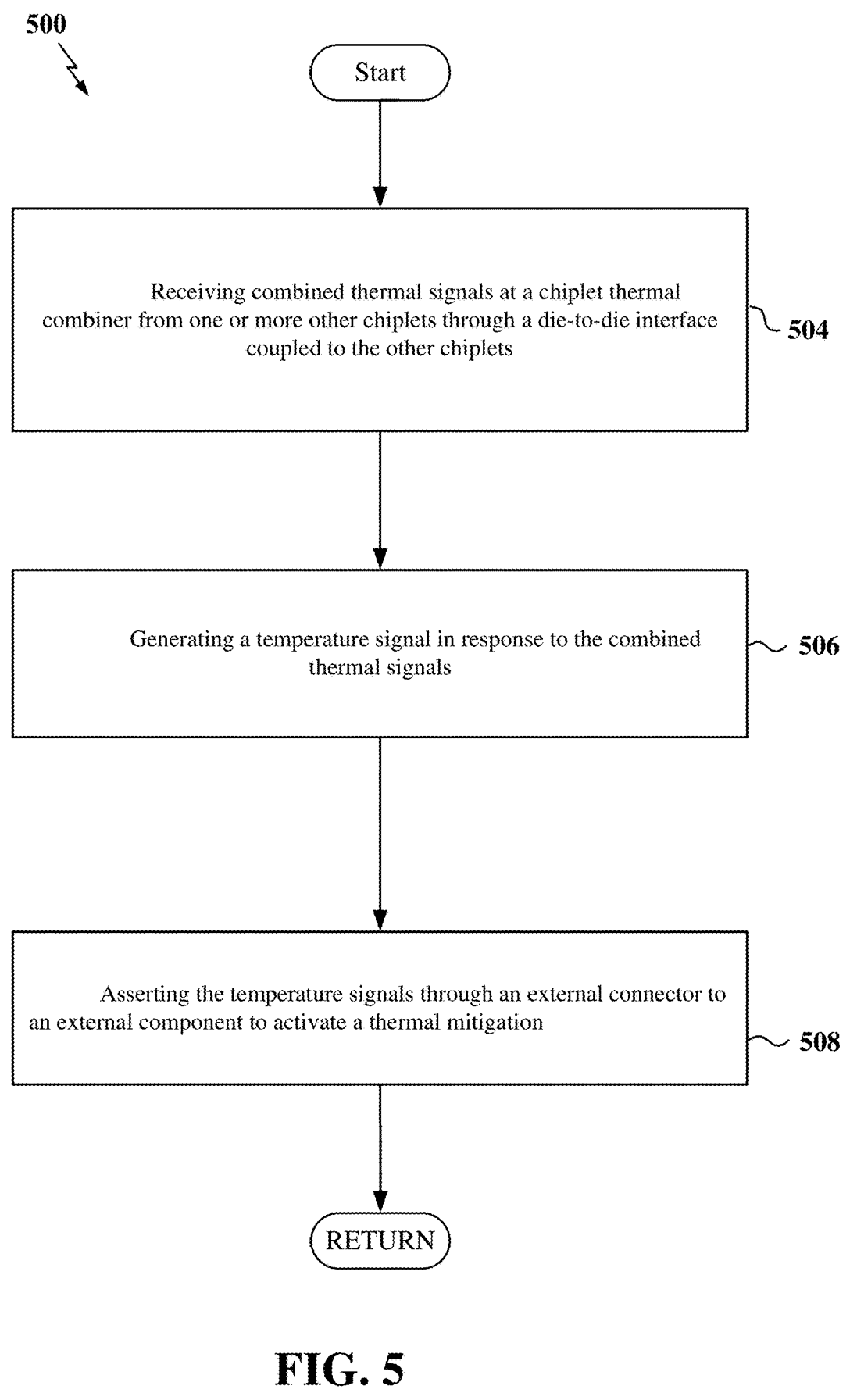

Start

Receiving combined thermal signals at a chiplet thermal combiner from one or more other chiplets through a die-to-die interface coupled to the other chiplets

504

Generating a temperature signal in response to the combined thermal signals

506

Asserting the temperature signals through an external connector to an external component to activate a thermal mitigation

508

RETURN

FIG. 5

COMMUNICATION OF THERMAL STATES FOR CHIPLETS

TECHNICAL FIELD

Aspects of the present disclosure relate generally to communication of thermal states for chiplets and, in particular, to determining and communicating a temperature signal.

BACKGROUND

As integrated circuit (IC) chips grow smaller, it has become possible to package multiple chips into a single package. Each chip may be optimized for the cost, materials, fabrication process, and size that is best suited for a particular function. In such a package, a central processor may be fabricated separately from a graphics processor, a special purpose processor, a volatile memory, a non-volatile memory, an input/output controller, sensors, or other components. Different components may be packaged together to meet different needs without redesigning any of the individual components. By placing these disparate chips into a single package, the total system that includes the package may be made smaller. Similar principles apply to printed circuit board systems and subsystems. In addition, the connections between the disparate chips may be faster at less cost. In some cases, the smaller chips e.g., a memory, special purpose processor, or an interface are referred to as chiplets.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example a processing system includes a plurality of chiplet thermal sensors configured to generate thermal signals in response to a temperature of the chiplet. A chiplet thermal combiner is coupled to the thermal sensors and configured to receive the thermal signals from the thermal sensors, to generate a combined thermal signal in response, and to generate a temperature signal in response to the combined thermal signal. An external connector is coupled to the chiplet thermal combiner and configured to assert the temperature signal to an external component to activate a thermal mitigation.

In another example a chiplet includes a die-to-die interface coupled to one or more chiplets to receive combined thermal signals from the chiplets. The chiplet includes a chiplet thermal combiner coupled to the die-to-die interface to receive the combined thermal signals and configured to generate a temperature signal in response thereto, and an external connector to assert the temperature signal to an external component to activate a thermal mitigation.

In another example a method includes receiving one or more thermal signals from one or more thermal sensors in response to the temperature of a chiplet, combining the one or more thermal signals to generate a combined thermal signal, generating a temperature signal in response to the combined thermal signal, and asserting the temperature signal on an external connector of the chiplet to an external component to active a thermal mitigation for the chiplet.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 4 is a process flow diagram illustrating an example of a method for asserting a temperature signal to an external component, in accordance with aspects of the disclosure.

FIG. 5 is another process flow diagram illustrating an example of a method for asserting a temperature signal to an external component, in accordance with aspects of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A die-to-die connection herein can refer to a connection between a chiplet and any other die, including a chip or a chiplet. A die may be considered to be any integrated circuit that is formed on and then cut, removed, or otherwise extracted from a wafer. The wafer may be silicon, glass, gallium nitride, or any other suitable material for forming integrated circuits. A system on a chip (SoC) may include one or more chips or chiplets in a single package. The SoC may have one or more chiplets and one or more chiplet thermal sensors thermally coupled to the chiplet and configured to generate thermal signals in response to the temperature of the chiplet. The thermal signals are received at a chiplet thermal combiner coupled to the one or more chiplet thermal sensors. The thermal combiner generates a combined thermal signal in response to the thermal signals. The combined thermal signal allows the temperature of the chiplet, specifically, to be monitored and measured. This information may be used internally or externally to control thermal mitigation.

A temperature signal asserted in response to a thermal signal from a chiplet may be used to indicate thermal risks for the chiplet. The temperature signal may be used as an emergency signal from within an SoC and even be shared externally for thermal mitigation. Each chiplet in an SoC may be configured with a respective temperature signal independent of the other chiplets and independent of a processor or controller of the SoC. The multiple independent temperature signals may be asserted to an external component independently or using die-to-die (D2D) connections through other chiplets.

Figure 1:
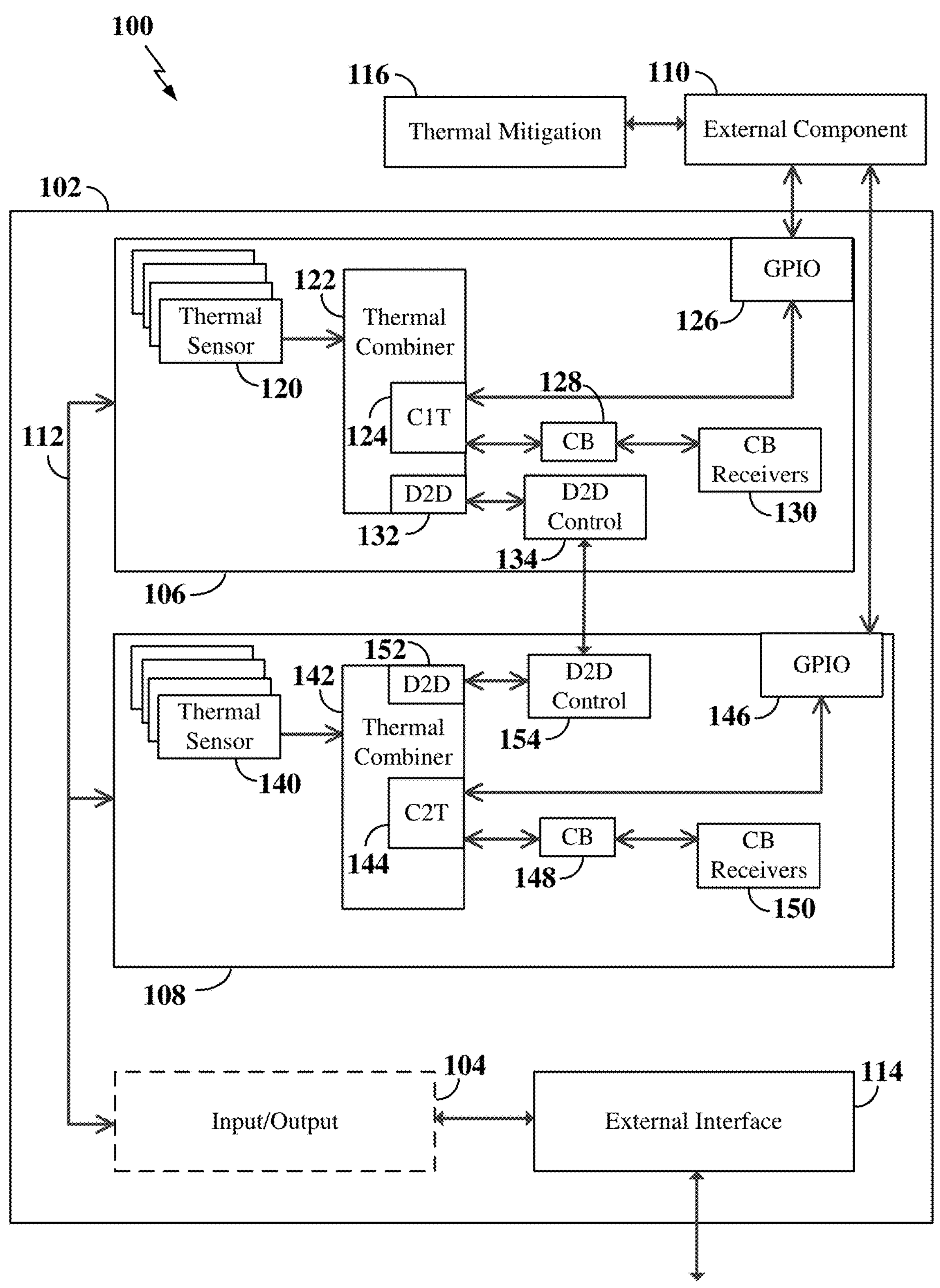
FIG. 1 is a block diagram is a block diagram of a processing system 100 that includes an SoC and an external component, in accordance with aspects of the disclosure.

FIG. 1 is a block diagram of a processing system 100 that includes an SoC 102, and an external component 110, e.g., an embedded controller. The SoC has a first chiplet 106, a second chiplet 108, an optional input/output (I/O) die 104 or chiplet, and a bus 112 to couple the first chiplet 106 and the second chiplet 108 to each other and optionally to the I/O die for data and control. The chiplets may be core chiplet dies (CCDs), or any other category or class of chiplets. While two chiplets are shown, there may be more. The I/O die is also coupled to an external interface 114 for data and control communications. The structure of the SoC may be adapted to suit different uses and may include all types of current packaging options from different fabricators and fabrication processes. Examples include 2D packaging, 2.5D packaging, 3D packaging and other approaches e.g., silicon-bridge, embedded multi-die interconnect bridge (EMIB), interposer-based chip-on-wafer-on-substrate (CoWoS), and fan-out chip on substrate (FOCoS) interposer packages. The illustrated components and any other connection between the dies may be on the same substrate or multiple substrates.

In accordance with various aspects of the disclosure, an element, or any portion of an element, or any combination of elements may be implemented with the processing system 100. Examples of the I/O die 104 and the chiplets 106, 108 include microprocessors, microcontrollers, digital signal processors (DSPs), field programmable gate arrays (FPGAs), programmable logic devices (PLDs), state machines, gated logic, discrete hardware circuits, and other suitable hardware. In various examples, the processing system 100 may be configured to perform any one or more of the functions described herein. In some examples, the I/O die 104 and the chiplets 106, 108 are a part of an SoC. The SoC 102 contains other components (not shown) configured to perform other functions of the SoC as is suitable for the type of processing system 100.

The SoC 102 may be configured to operate as or to include a central processor, a graphics processor, a special purpose processor, a volatile memory, a non-volatile memory, an input/output controller, or any other suitable components with a processor or controller and chiplets. The bus 112 may include any number of interconnecting buses and bridges depending on the specific application of the SoC 102, the die chiplets and the overall design constraints. The bus 112 may also link various other circuits such as timing sources, peripherals, data buffers, modules, power management circuits, and other processing cores, which are not described any further. An external interface 114 provides an interface between the I/O 104 and other optional external interfaces e.g., a control interface and a data interface, etc. Optionally, a different infrastructure fabric may be provided to allow for external connections. The external interface 114 may be used to provide a communication interface or means of communicating with various other apparatuses and devices (for example, other devices housed within the same package or system) over an internal bus or external transmission medium, such as command and control interface for power regulation, power-on test, and other purposes. The external interface 114 may be used to provide data connections other than a die-to-die connection to other types of components within the package or system.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

The first chiplet 106 has one or more thermal sensors 120. These may be thermally coupled to logic gates, memory, power controllers and other components (not shown) of the chiplet 106. The thermal sensors are configured to detect a temperature and to generate a thermal signal that represents or indicates the detected temperature. In some aspects, a thermal diode is placed in a thermally coupled position and the voltage across the thermal diode is used as the thermal signal. The thermal signal may be scaled, adjusted, and/or otherwise manipulated for use in this system. In some aspects, the thermal sensor includes a sample and hold circuit or a digital-to-analog converter to convert the thermal signal into a more useful form.

The one or more thermal sensors 120 are coupled to a thermal combiner 122 that receives the thermal signals from the one or more thermal sensors 120. The thermal combiner combines the thermal signals in any of a variety of different ways to generate a temperature signal that is stored in a chiplet temperature register 124 for the first chiplet (CIT). The temperature signal is provided to an external connector 126, e.g., a general-purpose input/output (GPIO) connector. The chiplet temperature register 124 allows for a direct connection to the GPIO connector, however any other suitable configuration may be used. The external connector is coupled to an external component 110. The external component 110 is shown as being outside the SoC 102 but this is not required. The external component 110 controls or is coupled to a thermal mitigation system 116. In the event that the temperature signal indicates that the chiplet is too hot, then a suitable thermal mitigation measure may be taken, e.g., reduced clock speed, reduced voltage, reduced instructions, idling functions or workflow, increased active cooling, temporary sleep state or shutdown state, shutting down the chiplet or a part of the chiplet, etc.

At the thermal combiner 122, the thermal signals may be aggregated by averaging, weighted averaging, statistical methods, and by searching for maxima, minima, or deflection points to generate an aggregated thermal signal. The aggregated thermal signal may be used as the temperature signal or additional operations may be performed to form a temperature signal, e.g., scaling, thresholding, binning, factoring, etc. The resulting temperature signal is used as a representation of the thermal state of the chiplet. The thermal state may be a single value or there may be different values for different parts of the chiplet. The chiplet temperature register 124 may store one or more temperature signals for different aspects of the chiplet or different times. In addition to the external connector 126, the chiplet temperature register 124 is also coupled to a central broadcast (CB) register 128. The broadcast register is coupled to CB receivers 130 for all of the chiplets.

Central Broadcast (CB) refers to any simple data interface. A variety of different low-level interfaces may be used to share the thermal information. It is used herein to send a signal from one source or CB register 128 to multiple CB receivers 130, wherein the single box is to indicate multiple CB receivers that are connected to different parts of the respective chiplet. The CB receivers filter signals received on the bus to isolate the signals that are directed towards the respective CB receiver and that apply the signals to the intended use. The other signals are discarded. In some examples, CB receivers do not send any acknowledgement to the source and the source does not wait for any CB receiver to reply before changing the signal.

The thermal combiner 122 also includes a D2D register 132 for a die-to-die connection through a D2D controller 134 which serves as a D2D interface. The D2D controller 134 of the first chiplet 106 is coupled to a D2D controller 154 or D2D interface of the second chiplet 108 which is coupled to a corresponding D2D register 152 of a thermal combiner 142 of the second chiplet. The second chiplet 108 has one or more thermal sensors 140 thermally coupled to the chiplet and configured to generate thermal signals in response to the temperature of the second chiplet 108. The thermal signals are coupled to the thermal combiner 142 that receives the thermal signals and aggregates the thermal signals to generate a combined thermal signal. The combined thermal signal is used to generate a temperature signal in response to the combined thermal signal that is stored in a chiplet temperature register 144 labeled as C2T.

The second chiplet 108 also has an external connector 146, e.g., a GPIO interface similar to that of the first chiplet 106, to connect to the external component 110 on one side and to the chiplet temperature register on the other side in the same way as the first chiplet 106. The two independent external connectors 126, 146 allow each chiplet to quickly report the temperature state of the respective chiplet to the external component notwithstanding the activity or condition of the other chiplet. The second chiplet 106 also has a CB register 148 coupled to the chiplet temperature register 144 and to CB receivers 150. This allows for the same broadcast functions as with the first chiplet.

Using the two independent external connectors 126, 146, the temperature signal is asserted directly and independently for each chiplet. The assertion of the temperature signal does not depend upon other chiplets or on inter-chiplet communications. The external component 110 may be configured to post-process the temperature signals and has the flexibility to choose an action based on the temperature signal from each chiplet. To accomplish this, each chiplet is able to determine the temperature signal independently and each chiplet has an external connector.

The D2D connection using the two D2D controllers 134, 154 allows for temperature information to be sent from one chiplet to the other. This may be useful to support the core functions of the chiplet. In addition, one of the chiplets may perform some analysis or processing of temperature information from the other chiplet and then report the temperature signal of the other chiplet to the external component 110. The D2D connection may also be used as a backup for circumstances in which the external connector is not properly operational.

In some aspects, a first chiplet 106 may be designated as the main chiplet or the primary chiplet. The other chiplets, e.g., second chiplet 108 sends thermal signals from the thermal combiner 142 to the thermal combiner 122 of the primary chiplet 106. The thermal combiner 142 of the second chiplet may perform some aggregation or other operations on the thermal signals or simply acts as a relay for the raw data. The first chiplet 106, as the main chiplet, may post-process the thermal signals from any or all of the secondary chiplets of the SoC and store the resulting values as SoC temperature signals (ST). In some aspects the main chiplet thermal combiner determines a single ST for the whole SoC for a particular time.

The main chiplet can send the ST to the external component 110 to notify the external component to take a corrective measure. This simplifies any further processing by the external component 110. The main chiplet can also send the ST to one or more of the other chiplets, e.g., the second chiplet 108 over, e.g., the D2D interface, for usage by each respective chiplet. Two nearby chiplets within an SoC or other package can transfer heat between them. A thermal violation by one chiplet may cause a thermal violation by another chiplet. If the other chiplet is informed of the high temperature for the SoC, then the chiplet can move to a lower temperature mode. This allows the excess heat that is being contributed by the chiplet to the SoC to be reduced.

The chiplets may also send their respective temperatures, e.g., C1T, C2T, to each other to understand mutual heating impacts. A chiplet that receives C1T may be configured to recognize when a temperature, e.g., C1T, is high and if the high temperature is closely thermally coupled to the receiving chiplet. This information may be combined with the overall temperature of the SoC (ST). A chiplet may be configured with thermal mitigation techniques and structures that are best suited to the particular chiplet. This allows different chiplets to take different mitigation actions, as are appropriate to the particular chiplet. These operations may be in addition to, or instead of, any thermal mitigation system 116 from or through the external component 110.

The thermal signals may be processed by a separate processor (not shown) and/or by a separate temperature subsystem (not shown) of the SoC. The thermal signals may also be provided in one or another form to the external component 110 or another component through an external connector. Each chiplet may have additional processing, memory, sensor, communications, and other components to serve the particular intended function of the respective chiplet and the processing system 100.

Figure 2:
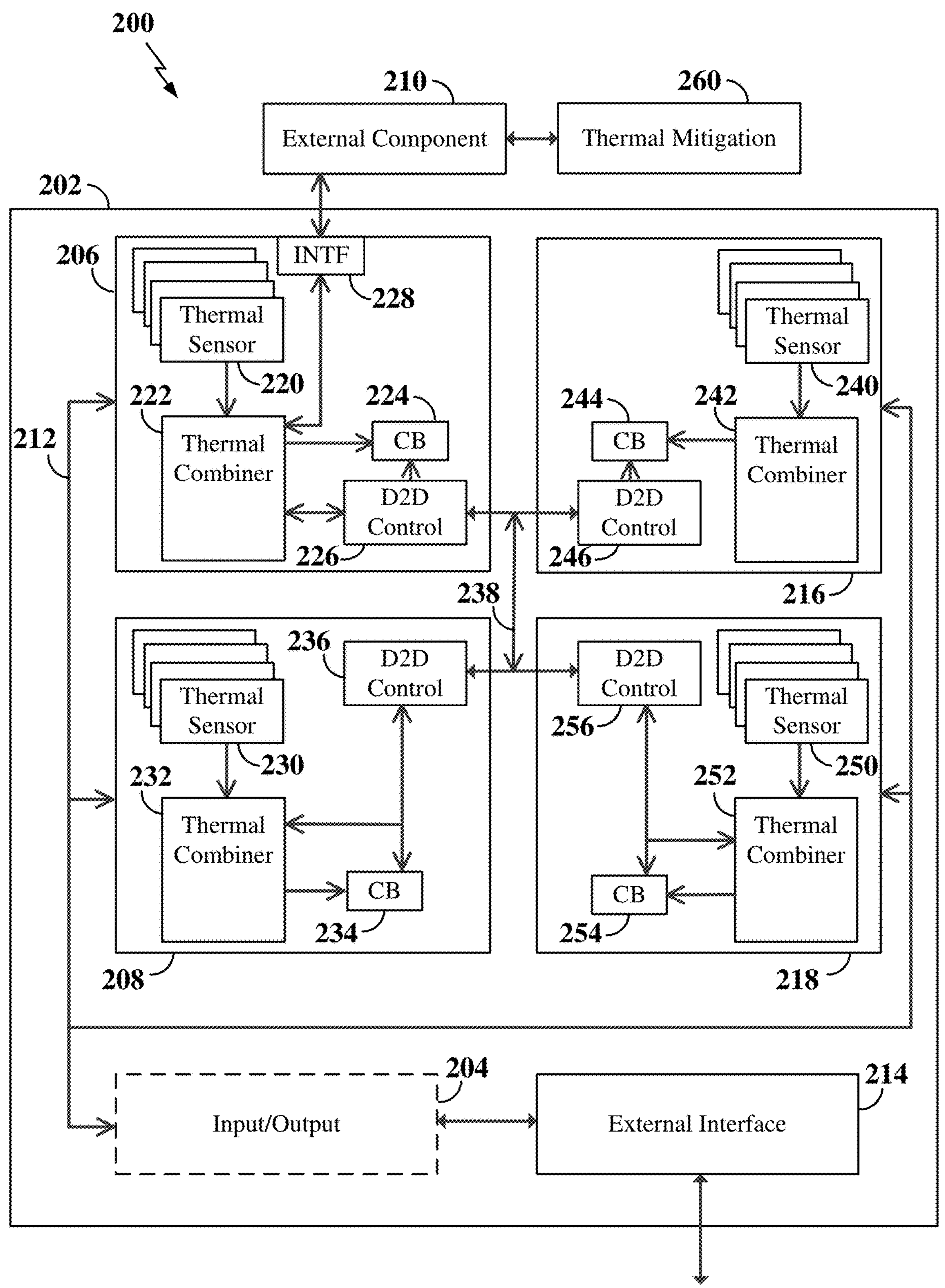
FIG. 2 is a block diagram is a block diagram of a processing system 100 that includes an SoC and an external component, in accordance with aspects of the disclosure.

FIG. 2 is a block diagram of a processing system 200 that includes an SoC 202, and an external component 210. The SoC optionally has an I/O die 204, a first chiplet 206, a second chiplet 208, a third chiplet 216, a fourth chiplet 218, and a bus 212 to couple the first chiplet 206, the second chiplet 208, the third chiplet 216, and the fourth chiplet 218 to each other and to the I/O die 204 for data and control. While four chiplets and one I/O die are shown, there may be more or fewer. The optional I/O die 204 is optionally coupled to an external interface 214 for data and control communications. Each chiplet may have additional processing, memory, sensor, communications, and other components to serve the particular intended function of the respective chiplet and the processing system 200.

The first chiplet 206 has one or more thermal sensors 220 coupled to a thermal combiner 222. The thermal combiner generates a temperature signal that is coupled to CB 224 and to a D2D controller 226. This configuration may be similar to or the same as that of the first chiplet of FIG. 1. The second chiplet 208 similarly has one or more thermal sensors 230 coupled to thermal combiner 232 to generate a combined thermal signal. The combined thermal signal or a temperature signal or both are coupled to a CB 234 and D2D controller 236.

The third chiplet 216 may have the same or a similar configuration with one or more thermal sensors 240 coupled to a thermal combiner 242 to generate a combined thermal signal. The thermal combiner 242 is similarly coupled to a CB 244 and D2D controller 246. The fourth chiplet 218 may have the same or a similar configuration with one or more thermal sensors 250 coupled to a thermal combiner 252 that is coupled to a CB 254 and D2D controller 256. The chiplets are shown as having similar thermal configurations, but the thermal configurations may be adapted to suit different needs and functions of different chiplets. The D2D connections allow different types of chiplets with different configurations to interact and to send temperature information to or through other chiplets.

Each chiplet 206, 208, 216, 218 has a D2D controller 226, 236, 246, 256 that is coupled to each other D2D controller. Any suitable interface may be used to facilitate the connection. In another example, one or more of the chiplets are coupled through another chiplet. Accordingly, a chiplet may be coupled to the first chiplet through one hop, two hops, or more hops, depending on the configuration and number of chiplets. In the illustrated example, only the first chiplet 206 has an external connector 228. The external connector 228 is coupled to an external component 210 to assert the temperature signal of each chiplet to the external component 210. In this configuration, there is some latency for the temperature signal from each chiplet to get asserted to the external component 210 through the single external connector 228. However, the connections are simpler and fewer. In some examples, the thermal combiner 222 or another component of the first chiplet 206 is capable of post-processing the thermal signals or combined thermal signal from the other chiplets to then assert the respective temperature signal to the external component 210. The external component 210 may communicate the thermal signals to a thermal mitigation system 260. The D2D connections allow temperature information and other information to be sent and received among the chiplets.

Figure 3:
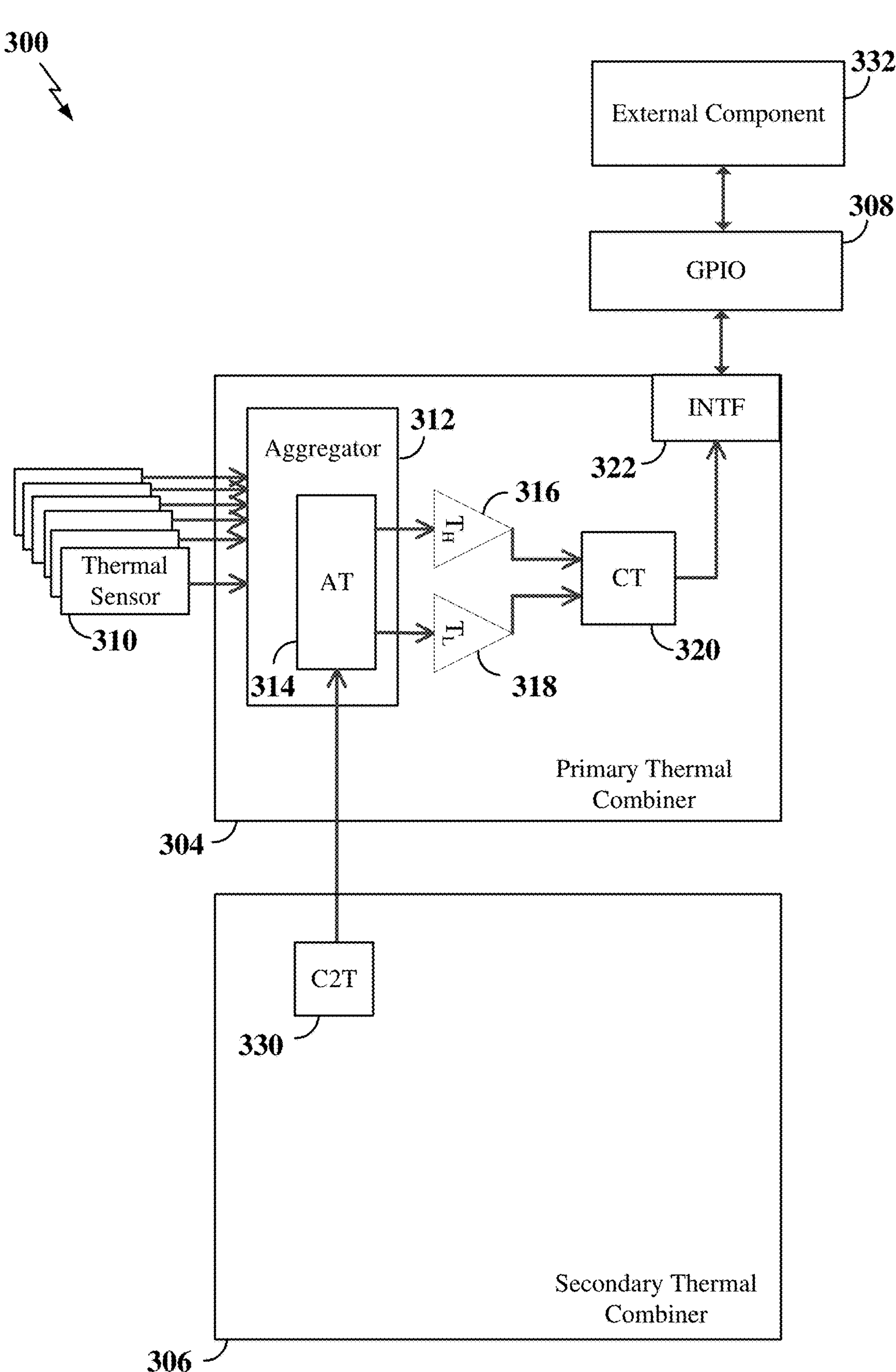
FIG. 3 is a block diagram of a thermal combiner, in accordance with aspects of the disclosure.

FIG. 3 is a block diagram of a thermal combiner suitable for use with the processing systems described above. A primary thermal combiner 304 is coupled to one or more thermal sensors 310. The thermal sensors generate thermal signals as discussed above. The primary thermal combiner 304 receives thermal signals at an aggregator 312. The aggregator combines the thermal signals to generate one or more combined thermal signals. The one or more combined thermal signals are stored in a combined thermal signal register 314. The aggregator may operate using any one or more of a variety of combining functions as mentioned above. In some examples, each combined thermal signal is an aggregated temperature.

The combined thermal signal is then analyzed to generate a temperature signal that is stored in a temperature signal block 320. In this example, the combined thermal signal in the thermal signal register 314 is applied to a first comparator 316. The comparator compares the combined thermal signal to determine if it exceeds a high threshold, TH. The result of the comparison is applied to the temperature signal block 320. The combined thermal signal is also applied to a second comparator 318. The second comparator compares the combined thermal signal to determine if it is less than a low threshold, TL. The result of the comparison is also applied to the temperature signal block 320. The temperature signal block, then provides the result to an interface 322 of the thermal combiner 304. The interface 322 is coupled to an external connector 308 of the chiplet, e.g., a GPIO, that is in turn coupled to an external component 332.

The temperature signal block may use only the first comparator 316 to determine whether the chiplet is too hot and then generate a temperature signal, e.g., PROCHOT_SOC, to indicate that the chiplet is too hot. Using the second comparator 318, the temperature signal block may provide a hysteresis function. As an example, the temperature signal block 320 may assert the temperature signal when the first comparator 316 indicates that the chiplet is too hot. The temperature signal block 320 may then maintain the asserted temperature signal to the interface 322 after the first comparator 316 indicates that the chiplet is no longer too hot. The temperature signal block 320 may then de-assert the temperature signal after the second comparator indicates that the chiplet is not too hot. Other more advanced signals may be used with more comparators and more thermal signals.

Stated another way, once asserted, the temperature signal is kept high until, or not de-asserted until, the thermal signal is less than the low threshold. A debounce circuit may also be used within the temperature signal block to reduce the frequency at which the temperature signal is asserted.

A secondary thermal combiner 306 also generates thermal signals, e.g., secondary thermal signals in response to the temperature of a secondary chiplet. The secondary thermal combiner 306 may generate a secondary combined thermal signal and may generate a secondary temperature signal. Either or both of these signals may be provided as secondary temperature information 330 to the primary thermal combiner 304. In this example, a secondary combined thermal signal is provided to the aggregator 312 of the primary thermal combiner 304. The primary thermal combiner analyzes the received signal and asserts or de-asserts a secondary temperature signal to the external connector 308 through the interface 322 of the primary thermal combiner 304. This allows the secondary chiplet to be simplified and it allows the communication to the external component 332 to also be simplified.

The thermal sensors 310 may be formed of simple hardware structures that may include a transducer, sample and hold circuit, registers and other components, or may be more complex. The aggregator 312 may be formed in hardware with dedicated circuitry or with firmware or software. In a software example, a chiplet may have local thermal combiner software, e.g., in the secondary thermal combiner 306, that communicates to main thermal combiner SW, e.g., primary thermal combiner 304, in a primary chiplet. In this example both thermal combiners may be separate software entities communicating to each other through a D2D or other type of interface.

FIG. 4 is a process flow diagram illustrating an example of a method for asserting a temperature signal to an external component as described in the context of FIGS. 1, 2, and 3. The method may be performed by a thermal combiner of a chiplet or operations may be performed by two different thermal combiners of two different chiplets. The method begins at 402 with receiving one or more thermal signals from one or more thermal sensors in response to the temperature of a chiplet. The thermal sensors may be the thermal sensors 120, 140, 220, 230, 240, 250 of FIG. 1 or 2. In examples, the chiplet is configured to interoperate with an external processor. In examples, the thermal sensors do not measure a temperature of the processor but only of the respective chiplet.

At 404, combining the one or more thermal signals to generate a combined thermal signal is performed. This may be done by an aggregator 312 of FIG. 3 within a thermal combiner 122, 142, 222, 232, 242, 252 304 or another type of circuit of a thermal combiner.

At 406, generating a temperature signal in response to the combined thermal signal is performed.

At 408, asserting the temperature signal on an external connector of the chiplet to an external component to active a thermal mitigation for the chiplet is performed. This may be performed through a GPIO interface 126 to an external component 110 as in FIG. 1, through an interface 228 to an external component 210 as in FIG. 2, or through an interface 332 to GPIO 308 to an external component 332 as in FIG. 3

FIG. 5 is a process flow diagram illustrating an example of a method for asserting a temperature signal to an external component through another chiplet as described in the context of FIGS. 2 and 3. The method may be performed by a thermal combiner 222 of a chiplet 206 or operations may be performed by two different thermal combiners 222, 232 of two different chiplets 206, 208 or more chiplets. The process begins at 504 with receiving combined thermal signals at a chiplet thermal combiner from one or more other chiplets through a die-to-die interface coupled to the other chiplets, e.g., a D2D interface 238 of FIG. 2.

At 506, generating a temperature signal in response to the combined thermal signals is performed. At 508, asserting the temperature signals through an external connector to an external component to activate a thermal mitigation is performed.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1:1. A processing system comprising: a plurality of chiplet thermal sensors configured to generate thermal signals in response to a temperature of the chiplet; a chiplet thermal combiner coupled to the plurality of chiplet thermal sensors and configured to receive the thermal signals from the plurality of chiplet thermal sensors, to generate a combined thermal signal in response thereto, and to generate a temperature signal in response to the combined thermal signal; and an external connector coupled to the chiplet thermal combiner and configured to assert the temperature signal to an external component to activate a thermal mitigation.

Example 2: The processing system of example 1, wherein the chiplet is a part of a system on a chip (SoC) and wherein the external component is external to the SoC.

Example 3: The processing system of example 1 or 2, wherein the external connector comprises a general-purpose input/output (GPIO) connector.

Example 4: The processing system of any one or more the above examples, wherein the chiplet thermal combiner is configured to aggregate the thermal signals to generate an aggregated thermal signal and to assert the temperature signal in response thereto.

Example 5: The processing system of example 4, wherein the chiplet thermal combiner is configured to compare the aggregated thermal signal to a high threshold and assert the temperature signal in response to the aggregated thermal signal exceeding the high threshold.

Example 6: The processing system of example 5, wherein the chiplet thermal combiner is configured to compare the aggregated thermal signal to a low threshold and to de-assert the temperature signal in response to the aggregated thermal signal being less than the low threshold.

Example 7: The processing system of any one or more of the above examples, wherein the chiplet is a part of a system on a chip (SoC), the processing system further comprising: one or more secondary chiplet thermal sensors thermally coupled to a secondary chiplet and configured to generate secondary thermal signals in response to the temperature of the secondary chiplet; a secondary chiplet thermal combiner coupled to the one or more secondary chiplet thermal sensors and configured to receive the secondary thermal signals and to generate a secondary combined thermal signal in response thereto; and a die-to-die interface coupled to the secondary chiplet thermal combiner configured to receive the secondary combined thermal signal, wherein the chiplet thermal combiner is coupled to the die-to-die interface to receive the secondary combined thermal signal, and configured to assert the temperature signal in response to the combined thermal signal and the secondary combined thermal signal.

Example 8: The processing system of example 7, wherein the chiplet thermal combiner is configured to assert a primary temperature signal in response the combined thermal signal and a secondary temperature signal in response to the secondary combined thermal signal.

Example 9: The processing system of example 7 or 8, wherein the chiplet thermal combiner is configured to assert the combined thermal signal to the secondary chiplet thermal combiner through the die-to-die interface.

Example 10: The processing system of example 7, 8, or 9, wherein the die-to-die interface is coupled to a broadcast transmitter from the secondary chiplet thermal combiner and configured to broadcast the secondary combined thermal signal to the chiplet thermal combiner.

Example 11 The processing system of any one or more of the above examples, wherein the thermal mitigation comprises shutting down the chiplet.

Example 12: A method comprising: receiving one or more thermal signals from one or more thermal sensors in response to the temperature of a chiplet; combining the one or more thermal signals to generate a combined thermal signal; generating a temperature signal in response to the combined thermal signal; and asserting the temperature signal on an external connector of the chiplet to an external component to active a thermal mitigation for the chiplet.

Example 13: A chiplet comprising: a die-to-die interface coupled to one or more chiplets to receive combined thermal signals from the chiplets; a chiplet thermal combiner coupled to the die-to-die interface to receive the combined thermal signals and configured to generate a temperature signal in response thereto; and an external connector to assert the temperature signal to an external component to activate a thermal mitigation.

Example 14: The chiplet of example 13, wherein the chiplet thermal combiner is configured to aggregate the combined thermal signals and to assert the temperature signals as an aggregated temperature signal.

Example 15: The chiplet of example 13 or 14, wherein the die-to-die interface is coupled directly to a second chiplet and coupled to a third chiplet through the second chiplet.

Example 16: The chiplet of any one or more of examples 13 to 15, wherein the chiplet thermal combiner is configured to broadcast the combined thermal signals to the chiplets through the die-to-die interface.

Example 17: The chiplet of example 16, further comprising a broadcast register coupled to the chiplet thermal combiner and configured to facilitate a broadcast of the combined thermal signals.

Example 18: A method comprising: receiving aggregated thermal signals at a chiplet thermal combiner from one or more chiplets through a die-to-die interface coupled to the chiplets; generating a temperature signal in response to the combined thermal signals; and asserting the temperature signals through an external connector to an external component to activate a thermal mitigation.

Example 19: The method of example 18, further comprising aggregating the thermal signals to generate the aggregated thermal signals by averaging the thermal signals.

Example 20: The method of example 18 or 19, further comprising: comparing the aggregated thermal signal to a low threshold; and de-asserting the temperature signal in response to the aggregated thermal signal being less than the low threshold.

What is claimed is:

1. A processing system comprising:

a chiplet;

a plurality of chiplet thermal sensors on the chiplet configured to generate thermal signals in response to a temperature of the chiplet;

a chiplet thermal combiner on the chiplet coupled to the plurality of chiplet thermal sensors and configured to receive the thermal signals from the plurality of chiplet thermal sensors, to generate a combined thermal signal in response thereto, to compare the combined thermal signal to a high threshold, to compare the combined thermal signal to a low threshold, and to generate a temperature signal in response to the combined thermal signal exceeding the high threshold; and an external connector coupled to the chiplet thermal combiner and configured to assert the temperature signal to an external component for a thermal mitigation, and to de-assert the temperature signal in response to the combined thermal signal being less than the low threshold.

2. The processing system of claim 1, wherein the chiplet is a part of a system on a chip (SoC) and wherein the external component is external to the SoC.

3. The processing system of claim 1, wherein the external connector comprises a general-purpose input/output (GPIO) connector.

4. The processing system of claim 1, wherein the chiplet thermal combiner comprises an aggregator that is configured to aggregate the thermal signals to generate an aggregated thermal signal.

5. The processing system of claim 4, wherein the chiplet thermal combiner comprises a first comparator that is configured to compare the aggregated thermal signal to the high threshold.

6. The processing system of claim 5, wherein the chiplet thermal combiner comprises a second comparator that is configured to compare the aggregated thermal signal to the low threshold.

7. The processing system of claim 1, wherein the chiplet is a part of a system on a chip (SoC), the processing system further comprising:

one or more secondary chiplet thermal sensors thermally coupled to a secondary chiplet and configured to generate secondary thermal signals in response to the temperature of the secondary chiplet;

a secondary chiplet thermal combiner coupled to the one or more secondary chiplet thermal sensors and configured to receive the secondary thermal signals and to generate a secondary combined thermal signal in response thereto; and a die-to-die interface coupled to the secondary chiplet thermal combiner configured to receive the secondary combined thermal signal, wherein the chiplet thermal combiner is coupled to the die-to-die interface to receive the secondary combined thermal signal, and configured to assert the temperature signal in response to the combined thermal signal and the secondary combined thermal signal.

8. The processing system of claim 7, wherein the chiplet thermal combiner of the first chiplet is configured to assert a primary temperature signal in response to the combined thermal signal of the first chiplet and a secondary temperature signal in response to the secondary combined thermal signal.

9. The processing system of claim 7, wherein the chiplet thermal combiner is configured to assert the combined thermal signal to the secondary chiplet thermal combiner through the die-to-die interface.

10. The processing system of claim 7, wherein the die-to-die interface is coupled to a broadcast transmitter from the secondary chiplet thermal combiner and configured to broadcast the secondary combined thermal signal to the chiplet thermal combiner.

11. The processing system of claim 1, wherein the thermal mitigation comprises shutting down the chiplet.

12. A method comprising:

receiving one or more thermal signals from one or more thermal sensors in response to a temperature of a chiplet;

combining the one or more thermal signals on the chiplet to generate a combined thermal signal;

comparing the combined thermal signal to a high threshold;

comparing the combined thermal signal to a low threshold;

generating a temperature signal on the chiplet in response to the combined thermal signal exceeding the high threshold;

asserting the temperature signal on an external connector of the chiplet to an external component for a thermal mitigation; and de-asserting the temperature signal in response to the combined thermal signal being less than the low threshold.

13. A chiplet comprising:

a die-to-die interface coupled to one or more chiplets configured to receive combined thermal signals from the one or more chiplets;

a chiplet thermal combiner coupled to the die-to-die interface configured to receive the combined thermal signals and configured to generate a temperature signal in response thereto, wherein the temperature signal indicates that at least one of the one or more chiplets has a thermal signal exceeding a high threshold; and an external connector configured to assert the temperature signal to an external component for a thermal mitigation, and to de-assert the temperature signal in response to the at least one of the one or more chiplets having a thermal signal being less than a low threshold.

14. The chiplet of claim 13, wherein the chiplet thermal combiner is configured to aggregate the combined thermal signals and to assert the temperature signals as an aggregated temperature signal.

15. The chiplet of claim 13, wherein the die-to-die interface is coupled directly to a second chiplet and coupled to a third chiplet through the second chiplet.

16. The chiplet of claim 13, wherein the chiplet thermal combiner is configured to broadcast the combined thermal signals to the one or more chiplets through the die-to-die interface.

17. The chiplet of claim 16, further comprising a broadcast register coupled to the chiplet thermal combiner and configured to facilitate a broadcast of the combined thermal signals.

18. A method comprising:

receiving aggregated thermal signals at a chiplet thermal combiner on a primary chiplet from one or more chiplets through a die-to-die interface coupled to the one or more chiplets;

comparing the aggregated thermal signals to a high threshold;

comparing the aggregated thermal signals to a low threshold;

generating a temperature signal on the primary chiplet in response to the aggregated thermal signals exceeding the high threshold;

asserting the temperature signals through an external connector of the primary chiplet to an external component to activate a thermal mitigation; and de-asserting the temperature signal in response to the combined thermal signal being less than the low threshold.

19. The method of claim 18, further comprising aggregating the thermal signals at the one or more chipsets to generate the aggregated thermal signals by averaging the thermal signals.

20. The method of claim 18, further comprising:

sending the temperature signal to the one or more chiplets through the die-to-die interface.

* * * * *